UNITED STATES PATENT OFFICE.

FRANCIS A. SAWYER, 2D, OF BOSTON, MASSACHUSETTS.

IMPROVEMENT IN PROCESSES OF RESTORING WASTE INDIGO.

Specification forming part of Letters Patent No. 120,215, dated October 24, 1871.

*To all whom it may concern:*

Be it known that I, FRANCIS A. SAWYER, 2d, of Boston, in the county of Suffolk and State of Massachusetts, have invented or discovered a new and useful Process or Means of Restoring Spent Indigo, so as to enable it to be used or utilized to advantage; and I do hereby declare the same to be fully described as follows:

From the nature of indigo it is only possible to employ it as a coloring agent while it is in a reduced state—that is to say, while deprived by some chemical reducing agent of an atom of its oxygen. Then the indigo becomes soluble in an alkali, and can be used to color. Now, in the process of printing, particularly what is termed "China blues," the reduced indigo is exposed to the atmosphere, and having a great affinity for oxygen, becomes more or less oxidized—that is, returned to its former insoluble blue state, and, after a time, can no longer be used either to color or print to advantage. Owing to the fact that the coloring matter has been thickened, or requires to be mixed with gum or starch to render the printing with it on cloth possible by a printing-machine, a second reduction of the indigo, as in the first instance, is found impracticable. Hence, the spent or oxidized indigo becomes, in most print-works, a waste. It is this mixture of gum, reducing agents, (as orpiment, tin, &c.,) alkali, (as soda,) and indigo in its oxidized state, that I propose to treat, to separate from it the indigo in a state fit for use in dyeing, coloring, or printing; and the process I have discovered and which I adopt for the accomplishment of such result I will now proceed to describe.

To thirty gallons of the waste liquor add about twelve times the amount of water. Next, the solution is to be heated until the gummy matter may have become thoroughly incorporated with or diffused in the water. Next I add to the solution one or more oxidizable materials, such as sulphate of copper, or bichromate of potash, for instance. I sometimes use hydrochloric acid, especially when the waste material or solution contains tin or arsenic or any other reducing agent upon which the hydrochloric acid, by its action, will produce oxygen. The quantity to be added may be, sulphate of copper, say about six pounds, or four pounds of the bichromate of potash; or, when hydrochloric acid is employed, about two pounds, or enough to sufficiently acidify the solution. Next, the solution should be well stirred, after which it should be allowed to stand still for about two days, when it will be found that the indigo will have been separated from the foreign matters in solution, and have settled at the bottom of the liquid. Next, the supernatant liquid is to be drawn off or separated from the indigo, or the latter abstracted from it by any proper means, after which there should be added to the indigo a suitable amount of alkali to neutralize the acid remaining therein. The indigo will then be found to be in a restored state, fit for use as a coloring agent.

I do not confine my invention to the precise proportions of the liquid and chemicals as hereinbefore set forth, as used with the amount of waste-indigo liquor as stated, as such may be considerably varied and be productive of good results.

I claim as my invention—

The process, substantially as described, of restoring waste indigo, as set forth.

FRANCIS A. SAWYER, 2D.

Witnesses:
 R. H. EDDY,
 J. R. SNOW.